US008848202B2

(12) United States Patent
Dyer et al.

(10) Patent No.: US 8,848,202 B2
(45) Date of Patent: Sep. 30, 2014

(54) OPTICAL PROXIMITY SENSORS WITH OFFSET COMPENSATION

(75) Inventors: Kenneth C. Dyer, Pleasanton, CA (US); Xijian Lin, Fremont, CA (US)

(73) Assignee: Intersil Americas LLC, Milpitas, CA (US)

(*) Notice: Subject to any disclaimer, the term of this patent is extended or adjusted under 35 U.S.C. 154(b) by 450 days.

(21) Appl. No.: 13/360,168

(22) Filed: Jan. 27, 2012

(65) Prior Publication Data

US 2013/0120761 A1 May 16, 2013

Related U.S. Application Data

(60) Provisional application No. 61/558,989, filed on Nov. 11, 2011.

(51) Int. Cl.
| | |
|---|---|
| *G01B 11/14* | (2006.01) |
| *G01C 3/10* | (2006.01) |
| *G01S 17/02* | (2006.01) |
| *G01S 7/481* | (2006.01) |
| *G01S 7/491* | (2006.01) |
| *G01C 3/08* | (2006.01) |

(52) U.S. Cl.
CPC ............... *G01S 7/481* (2013.01); *G01S 17/026* (2013.01); *G01C 3/08* (2013.01); *G01S 7/4912* (2013.01)
USPC .............................................. 356/614; 356/9

(58) Field of Classification Search
USPC ...................... 356/237.1–241.6, 242.1–243.8, 356/426–431, 600–640, 445, 448, 5.01–22; 250/206–215
See application file for complete search history.

(56) References Cited

U.S. PATENT DOCUMENTS

| | | | |
|---|---|---|---|
| 4,921,351 A * | 5/1990 | Kohigashi et al. ............ 356/323 |
| 5,045,685 A | 9/1991 | Wall | |
| 5,389,927 A * | 2/1995 | Turney et al. ................. 341/139 |
| 7,486,386 B1 * | 2/2009 | Holcombe et al. ........... 356/4.01 |
| 7,728,316 B2 * | 6/2010 | Fadell et al. ............. 250/559.38 |
| 7,907,061 B2 * | 3/2011 | Lin et al. .................... 340/686.6 |
| 8,222,591 B2 * | 7/2012 | Lin ........................ 250/214 DC |
| 2007/0099574 A1 * | 5/2007 | Wang ......................... 455/67.11 |

(Continued)

OTHER PUBLICATIONS

VCNL4000 Datasheet, "Fully Integrated Proximity and Ambient Light Sensor with Infrared Emitter and I2C Interface," Vishay Semiconductors, Rev. 1.6, Aug. 24, 2011, pp. 1-14.

(Continued)

*Primary Examiner* — Tarifur Chowdhury
*Assistant Examiner* — Jarreas C Underwood
(74) *Attorney, Agent, or Firm* — Vierra Magen Marcus LLP

(57) ABSTRACT

An optical proximity sensor includes a driver, light detector and offset signal generator. The driver selectively drives a light source. The light detector produces an analog detection signal indicative of an intensity of light detected by the light detector. The detected light can include light transmitted by the light source that reflected off an object within the sense region of the optical sensor, interference light and ambient light. The interference light includes light transmitted by the light source, and detected by the light detector, that was not reflected off an object within the sense region of the optical sensor. The offset signal generator selectively produces an analog offset signal that is combined with the analog detection signal produced by the photodetector to produce an analog compensated detection signal. The analog offset signal compensates for at least a portion of the interference light included in the light detected by the photodetector.

18 Claims, 13 Drawing Sheets

(56) References Cited

U.S. PATENT DOCUMENTS

| | | | |
|---|---|---|---|
| 2008/0135735 A1* | 6/2008 | Gottesman et al. | 250/214 A |
| 2008/0158184 A1* | 7/2008 | Land et al. | 345/173 |
| 2010/0245289 A1* | 9/2010 | Svajda | 345/175 |
| 2010/0254711 A1 | 10/2010 | Miller | |
| 2011/0121182 A1 | 5/2011 | Wong et al. | |

OTHER PUBLICATIONS

Hoppenstein, R. "DC Offset Auto-Callibration of TRF371x," Application Report SLWA057, Texas Instruments Incorporated, Mar. 2010, pp. 1-8.

* cited by examiner

OPTICAL PROXIMITY SENSORS WITH OFFSET COMPENSATION

PRIORITY CLAIM AND RELATED APPLICATION

This application claims priority under 35 U.S.C. 119(e) to U.S. Provisional Patent Application No. 61/558,989, entitled OPTICAL PROXIMITY SENSORS WITH OFFSET COMPENSATION, filed Nov. 11, 2011, which is incorporated herein by reference.

This application is related to commonly assigned U.S. patent application Ser. No. 12/716,220, entitled "Proximity Sensors with Improved Ambient Light Rejection", filed Mar. 2, 2010, by Xijian Lin, which is incorporated herein by reference.

BACKGROUND

Optical sensors, such as optical proximity sensors, typically include a light source and an adjacent photosensitive light detector. Such optical sensors can be used to detect the presence of an object, estimate proximity of an object and/or detect motion of an object, based on the magnitude of light originating from the light source that is reflected from an object and detected by the light detector. The value of these sensors has become more important with the advent of battery-operated handheld devices, such as mobile phones. For example, a fair amount of the energy from a mobile phone battery is used to drive the display, and there is value in turning off the display or backlight when the mobile phone or other device is brought to the user's ear (where it cannot be viewed anyway). Optical proximity sensors have been used for this, and many other applications.

For other examples, there are many other applications in which the presence of an object can be detected with an optical proximity sensor to advantage. These range from sensing when protective covers have been opened on machinery, paper has been positioned correctly in a printer, or an operator's hands are at risk near an operating machine. An optical proximity sensor can also be used as a simple touch or near-touch activated switch, and could be implemented in applications like keyboards or devices that have a plastic housing that is sealed but which allows the light from the source to pass through and be sensed by the detector on the return.

Light from the source to the detector that is not transmitted toward the target object, but rather is transmitted directly from the source to the detector, reduces the capability of the overall device to sense distance. Such light essentially propagates sideways within the package and is considered noise or "light leakage", and contains no information. To reduce and preferably prevent light leakage, an opaque light barrier is typically used to isolate the light source from the light detector. However, light barriers increase the complexity, cost and size of optical sensors. Additionally, light barriers are often imperfect, resulting in light leaking under, over and/or through the barrier.

Optical sensors are often used with (e.g., placed behind and/or covered by) a cover plate that is glass, plastic, or some other protective light transmissive material. For example, the cover plate can be the glass covering a screen of a mobile phone, portable music player or personal data assistant (PDA), or the plastic covering a screen of a laptop, netbook or tablet computer. When such a cover plate is placed over an optical sensor, the optical sensor is often susceptible to specular reflections. Specular reflections similarly reduce the capability of the overall device to sense proximity, since specular reflections are essentially noise that contain no information.

In view of the above, there has been a desire to minimize light being transmitted directly from a light source to a light detector, as well as to minimize specular reflections and/or other internally reflected light. Conventional attempts to achieve these goals typically relate to modification of the mechanical/structural design of optical sensors.

DETAILED DESCRIPTION

Figure 1:
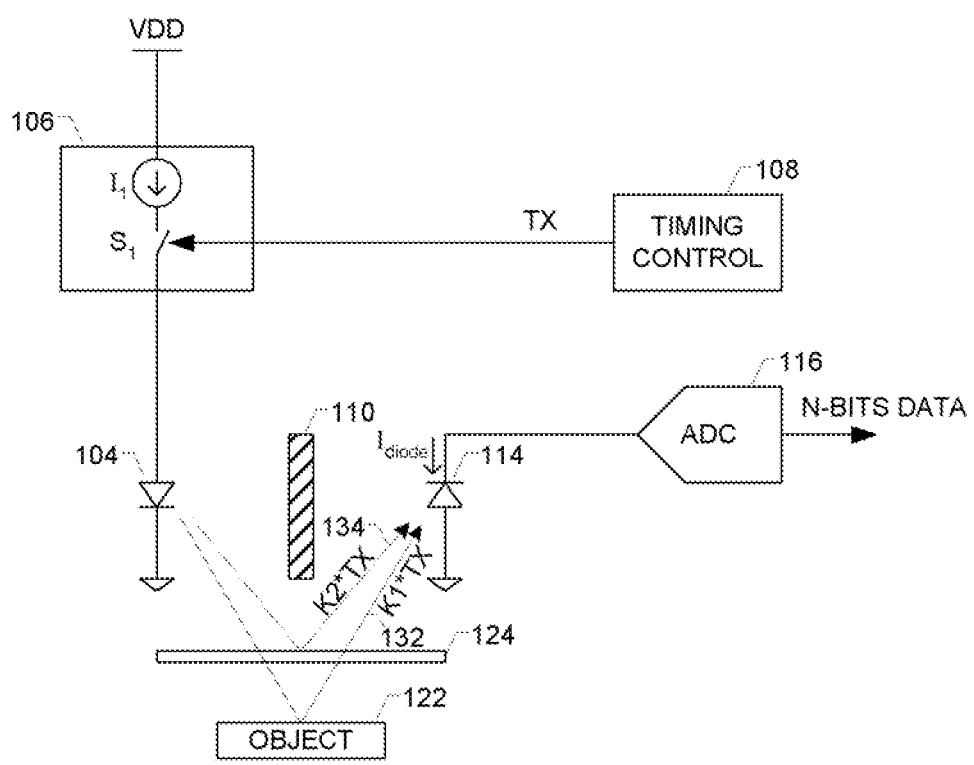
FIG. 1 shows an exemplary optical proximity sensor.

In the following detailed description, reference is made to the accompanying drawings that form a part hereof, and in which is shown by way of illustration specific illustrative embodiments. It is to be understood that other embodiments may be utilized and that mechanical and electrical changes may be made. The following detailed description is, therefore, not to be taken in a limiting sense. In the description that follows, like numerals or reference designators will be used to refer to like parts or elements throughout. In addition, the first digit of a reference number identifies the drawing in which the reference number first appears.

FIG. 1 shows an exemplary optical sensor 102, which can be a proximity sensor useful to detect the presence of an object, estimate proximity of an object and/or detect motion of an object. The optical sensor 102 includes a light detector 114 (also known as a photodetector), a driver 106, a timing controller 108, and an analog-to-digital converter (ADC) 116. The driver 106 is controlled by a transmit (TX) signal output by the timing controller 108 to selectively drive a light source 104. The light detector 114 generates an analog signal (e.g., a current) that is indicative of the intensity of the light incident on the light detector 114. The ADC converts the analog signal (e.g., a current) generated by the light detector 114 into a digital signal (e.g., an N-bit signal) that can be used to detect the presence, proximity and/or motion of an object 122. The light source 104 can be, e.g., one or more light emitting diode (LED) or laser diode, but is not limited thereto. While infrared (IR) light sources are often employed in optical proximity sensors, because the human eye can not detect IR light, the light source can alternatively produce light of other wavelengths. The light detector can be, e.g., one or more photodiode (PD), but is not limited thereto.

The driver 106 is generally shown as including a current source $I_1$ and a switch $S_1$ that is selectively closed based on the transmit (TX) signal output by the timing controller 108. When the switch $S_1$ is closed, the current produced by the current source $I_1$ is provided to the anode of the light source 104, to thereby selectively cause light to be transmitted. Alternatively, the TX signal can selectively cause a current to be pulled through the light source 104, e.g., by coupling the switch $S_1$ and the current source $I_1$ between the cathode of the light source 104 and a low voltage rail (e.g., ground), to thereby cause light to be transmitted. An object within the sense region of the optical sensor and whose proximity, presence and/or motion is being detected by the sensor 102 is represented by block 122. The sense region refers to the region or area within which an object can be detected by the optical sensor. An object can be outside of the sense region, e.g., if the object is too far away from the optical sensor; or if the object, even if close to the optical sensor, is positioned relative to the sensor such that light emitted by the light source is not reflected back to the light detector.

An opaque light barrier 110 is shown as being located between the light source 104 and the light detector 114, to isolate the light source from the light detector. However, as mentioned above, light barriers are often imperfect, resulting in light leaking under, over and/or through the barrier. A cover plate 124, which protects and/or disguises the light source 104 and the light detector 114, can be part of the optical sensor 102 or can be external (e.g., adjacent) the optical sensor 102. Such a cover plate 124, as mentioned above, may cause specular reflections and/or other internal reflections. Internal reflections can also result from other physical parts included within the optical sensor 102. For the purpose of the description herein, the cover plate 124 is not considered an object within the sense region of the optical sensor, since it is preferably that the optical sensor operates as if the cover plate 124 was not present.

Still referring to FIG. 1, light transmitted by the light source 104, reflected by the object 122, and incident on the photodetector 114, is represented by line 132. Such reflected light of interest causes the photodetector 114 to produce a signal (e.g., a current) that can be expressed as K1*TX, where K1 is indicative of a magnitude of the light reflected from the object 122 and incident on the light detector 114, and TX is a binary value of either 0 or 1.

In FIG. 1, light that is generally not of interest (at least with regard to detecting the proximity, presence and/or motion of the object 122) is represented by dashed line 134 and can be caused by specular reflections and/or other internal reflections and/or light leaking under, over and/or through the barrier 110. Such light that is generally not of interest (at least with regard to detecting the proximity, presence and/or motion of the object 122), shall be generally referred to as interference light, and causes the photodetector 114 to produce a signal (e.g., a current) that can be expressed as K2*TX, where K2 is indicative of a magnitude of the interference light incident on the light detector 114, and TX is the binary value of either 0 or 1. Such interference light reduces the dynamic range of the optical sensor 102, which reduces the detection range of the optical sensor 102. Interference light, as the term is used herein, does not include ambient light, which may be from sun light, halogen light, incandescent light, fluorescent light, etc.

As can be appreciated from the above discussion, the light detector 114 (e.g., a photodiode) produces a detection signal (e.g., $I_{diode}$) that can be expressed as $I_{diode}$=K1*TX+K2*TX (ignoring ambient light, for the time being). As explained above, with regard to detecting the proximity, presence and/or motion of the object 122, K1*TX is indicative of the light of interest, and K2*TX is indicative of the interference light. In other words, the detection signal (e.g., $I_{diode}$) produced by the light detector includes both light of interest as well as interference light. The detection signal (e.g., $I_{diode}$) may also include ambient light, which may also not be of interest (at least with regard to detecting the proximity, presence and/or motion of the object 122). There are various different techniques to reduce and preferably minimize the affects of ambient light, some of which are described herein. However, initially, the discussion below will not focus on ambient light.

As just explained, the detection signal (e.g., $I_{diode}$) produced by the light detector 114 (e.g., a photodiode) can be expressed as $I_{diode}$=K1*TX+K2*TX. In accordance with specific embodiments of the present invention, an analog offset signal (e.g., an offset current), which can be expressed as Koff*TX, is combined with the detection signal to produce an analog compensated detection signal (e.g., $I_{comp}$), which can also be referred to as an analog offset compensated detection signal. Such an offset signal can be used to compensate for the interference light to increase both the dynamic range and detection range of the optical sensor. More specifically, by using the offset signal, $I_{comp}$=$I_{diode}$−Koff*TX=K1*TX+K2*TX−Koff*TX. If Koff=K2, then $I_{comp}$=K1*TX, and the affects of the interference light are substantially eliminated (i.e., cancelled). In other words, if Koff=K2, then K2*TX−Koff*TX=0. More generically, Koff can be selected such that K2*TX−Koff*TX=Y, where Y is a selectable (e.g., programmable) value that can be specified. While Y can be specified to equal zero, it is also within the scope of the present invention that Y is a value other than zero, e.g., a desired fixed offset value. In other words, rather than substantially or completely performing interference light offset cancellation, partial interference light offset cancellation can be performed to achieve a desired fixed offset.

Figure 2A:
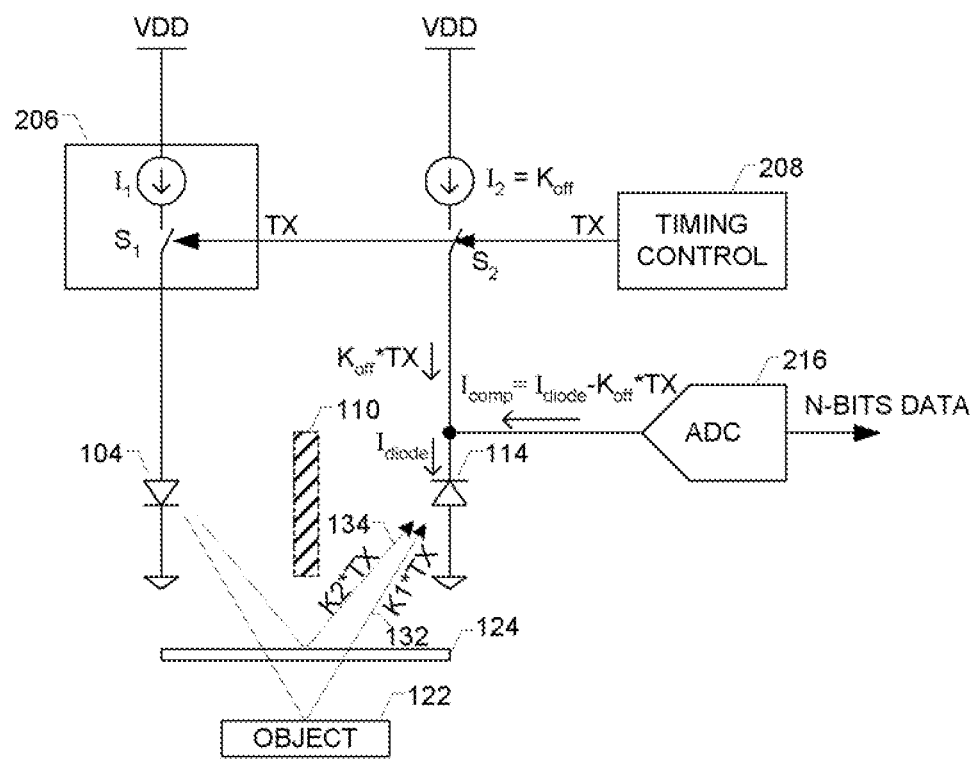
FIGS. 2A-2D show optical proximity sensors according to various embodiments of the present invention.

FIG. 2A illustrates an optical sensor 202a, according to an embodiment of the present invention. The optical sensor 202a includes a light detector 114 (also known as a photodetector), a driver 206, a timing controller 208, and an analog-to-digital converter (ADC) 216. The driver 206 is controlled by a transmit (TX) signal output by the timing controller 208 to selectively drive the light source 104. The light detector 114 generates an analog signal (e.g., a current) that is indicative of the intensity of the light incident on the light detector 114. The ADC 216 converts the analog signal (e.g., a current) generated by the light detector 114 into a digital signal (e.g., an N-bit signal) that can be used to detect the presence, proximity and/or motion of an object 122.

The driver 206 is generally shown as including a current source $I_1$ and a switch $S_1$ that is selectively closed based on the transmit (TX) signal output by the timing controller 208. When the switch $S_1$ is closed, the current produced by the current source $I_1$ is provided to the anode of the light source 104, to thereby selectively cause light to be transmitted. Alternatively, the TX signal can selectively cause a current to be pulled through the light source 104, e.g., by coupling the switch $S_1$ and the current source $I_1$ between the cathode of the light source 104 and a low voltage rail (e.g., ground), to thereby cause light to be transmitted.

The optical sensor 202a also includes a current source 12 to selectively provide an offset current Koff, such that $I_{comp}=K1*TX+K2*TX-Koff*TX$. In FIG. 2A, the offset current is combined with the detection signal within the signal path between the light detector 114 and the input to the ADC 216. This has the affect of increasing the dynamic range of the ADC 216, which increases the detection range of the optical sensor 202a. In embodiments of the present invention described with reference to FIGS. 2A-2D, a barrier 110 is optional, and is thus shown in dotted line, because embodiments of the present invention can be used to eliminate the need for any light barrier at all. In this embodiment, as well as the other embodiments described below, the TX signal selectively enables the DAC 242 (or 262) to produce the offset signal at the same time the driver 206 is driving the light source 104 to transmit light. Benefits of this are described below.

Figure 2B:
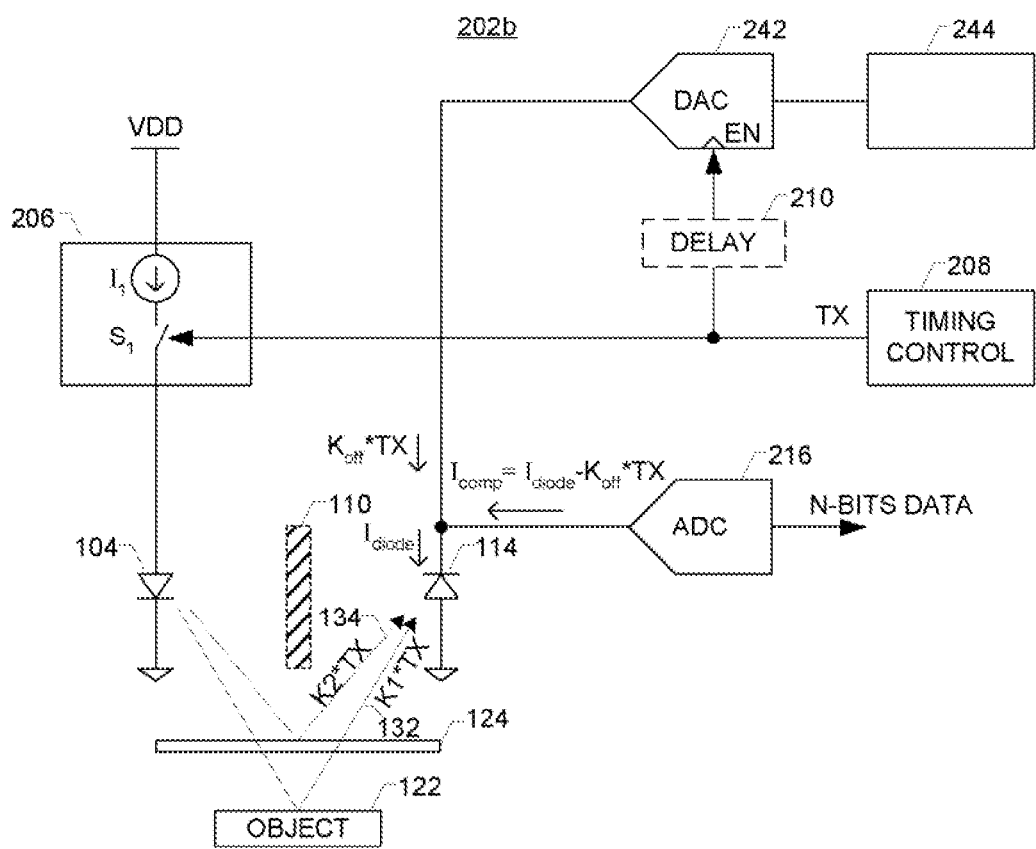

FIG. 2B illustrates an optical sensor 202b, according to an embodiment of the present invention, that includes a digital-to-analog converter (DAC) 242 that can be used to convert a stored digital value to the offset signal (e.g., Koff*TX). Such a digital value can be stored in a register, random access memory (RAM), or some other storage device, which are collectively represented by block 244. The stored value can be programmed and reprogrammed as desired, e.g., using a bus, such as, but not limited to, an I2C bus, or using some other digital interface. Also shown in FIG. 2B is an optional delay 210 that can be used to intentionally adjust (e.g., skew) the timing between the TX signal provided to the driver 206 that driver the light source 104 and the TX signal that drives the DAC 242 that generates the offset signal (e.g., Koff*TX). This delay 210 can be used to optimize performance, e.g., if the light source 104 takes some time before it emits light in response to the driver 206 being enabled. A similar delay 210 can be added to the other embodiments of the present invention, including the embodiments shown in FIGS. 2A, 2C and 2D.

Figure 2C:
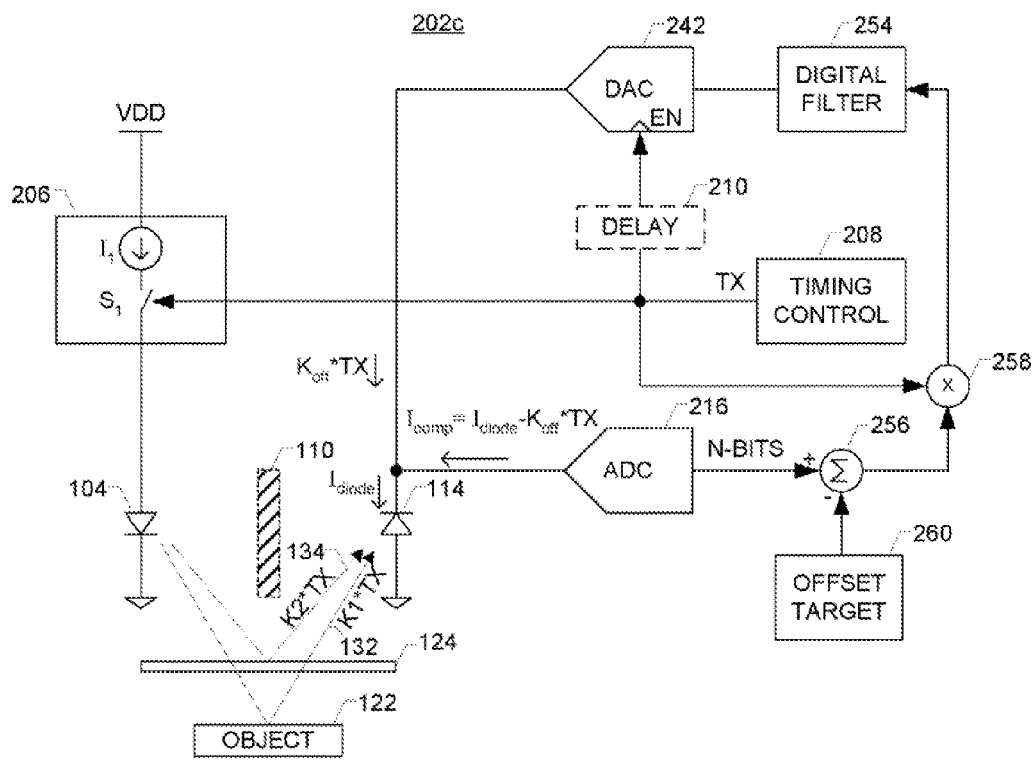

FIG. 2C illustrates an optical sensor 202c, according to an embodiment of the present invention, that includes a control loop to dynamically set a digital value provided to the DAC 242, so that when there is no object within the sense region of the optical sensor 202c, the output of the ADC 216 will match an offset target value stored in block 260. The control loop is shown as including the ADC 216, a digital summer 256 (which in this case acts as a subtractor), a multiplier 258, a digital filter 254 and the DAC 242. The digital filter 254 can be an integrator or accumulator, but is not limited thereto. The block 260 can be, e.g., a register, random access memory (RAM), or some other storage device.

Figure 4:
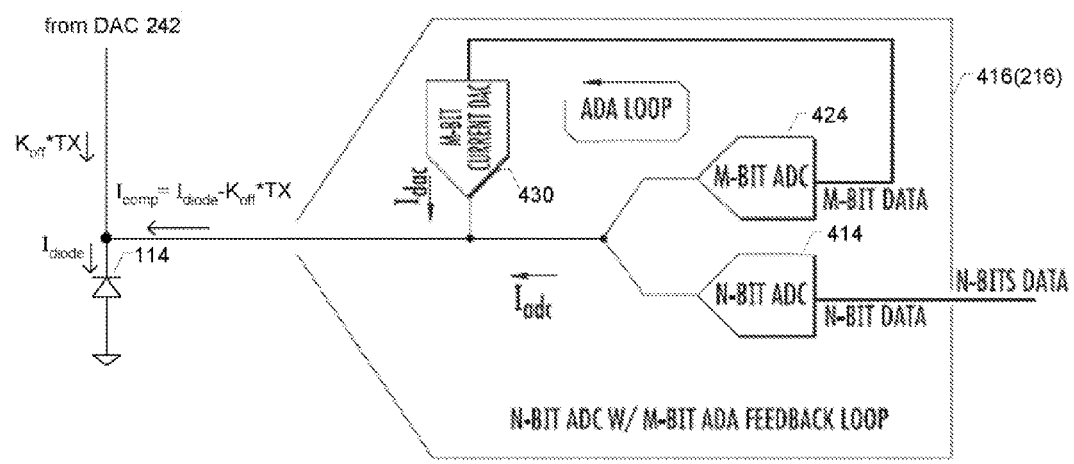
FIG. 4 provides additional details of the analog-to-digital converter (ADC) shown in FIGS. 2A-2D, according to specific embodiments of the present invention.
Figure 5:
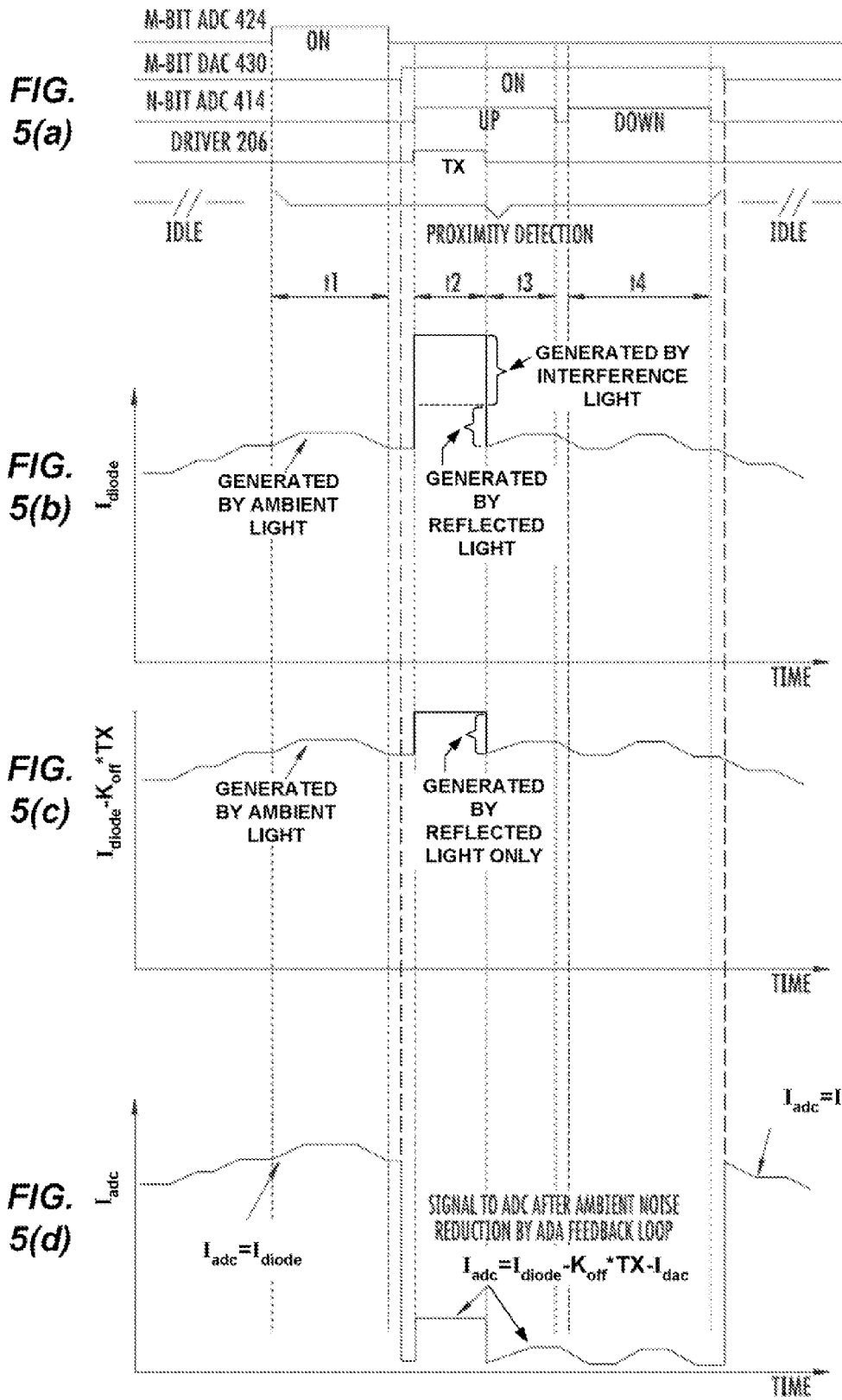
FIG. 5 shows a timing diagram of signal processing for a proximity detection according to an embodiment of the present invention.

In accordance with specific embodiments of the present invention, the ADC 216 is implemented as an ADC with analog-to-digital-to-analog (ADA) feedback, which as described below with reference to FIGS. 4 and 5, is useful for rejecting ambient light. As explained above, the driver 206 selectively drives the light source 104 to transmit light based on the TX signal received from the timing controller 208. Accordingly, there are time periods during which the light source 104 is not transmitting light (and thus no reflected light, originating from the light source, is incident on the light detector 114), yet ambient light is still incident on the light detector 114. In such embodiments, as well as other embodiments, the ADC 216 performs portions of its analog-to-digital conversions during periods of time that the light source 104 is driven to transmit light as well as during periods of time that the light source 104 is not driven to transmit light. This enables the ADC 216 to be used to reject ambient light, as will be appreciated from the discussion of FIGS. 4 and 5 below.

Figure 2D:
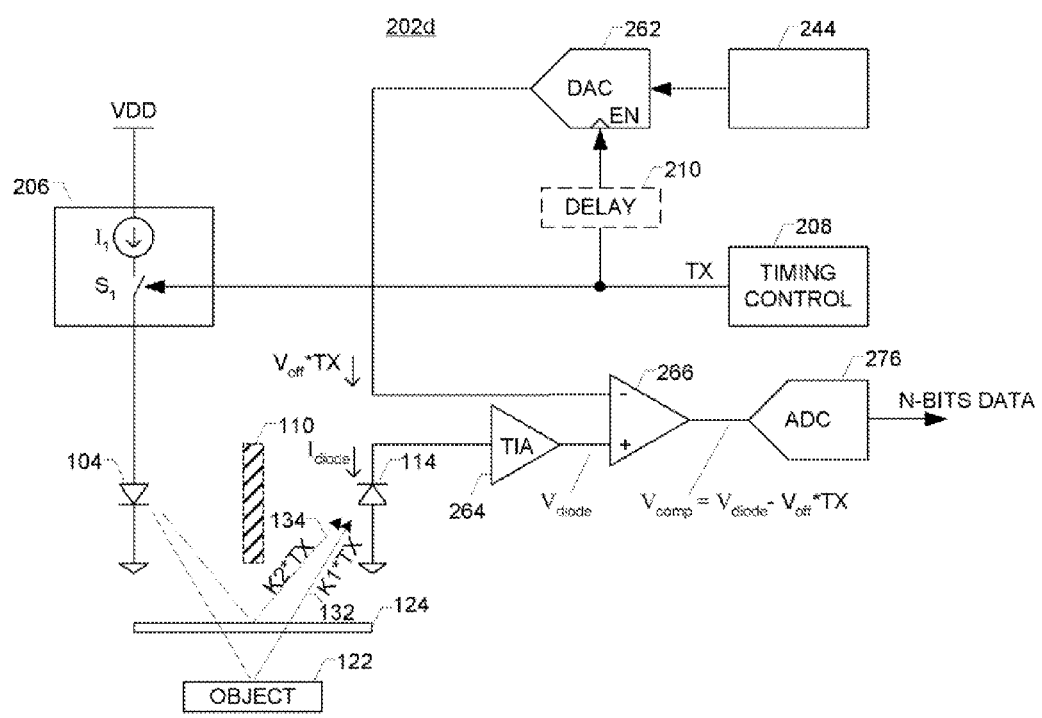

However, because the ADC 216 performs portions of its analog-to-digital conversions during periods of time that the light source 104 is not driven to transmit light, to enable accurate compensation for interference light, the producing of the analog offset signal should be synchronized with the driving of the light source 104 to transmit light (i.e., so that the analog offset signal is produced at the same time that the light source is transmitting light). To achieve such synchronization, the TX signal is used to control the driver 206 to selectively drive the light source 104, as well as to control the producing of the analog offset signal (Koff*TX), as is shown in FIGS. 2A-2D. For example, in the embodiment of FIG. 2A, the TX signal controls the switches S1 and S2 so that the analog offset signal is only produced when the light source 104 is transmitting light. In FIGS. 2B-2D, the TX signal controls switch S1 and is provided to the enable pin of the DACs 242 and 262 so that the analog offset signal is only produced when the light source 104 is transmitting light.

In FIGS. 2A-2D the driver 206 selectively drives the light source when the TX signal closes the switch S1. More generically, the driver 206 can be considered to have an enable pin that receives the TX signal, such that the TX signal functions as an enablement signal (as it does for the DACs 242 and 262 in FIGS. 2B-2D).

Referring to FIG. 2C, in accordance with an embodiment, the digital summer 256, the digital filter 254 and the multiplier 258 can be outside a chip that includes the DAC 242 and ADC 216 and can be used during foundry or post-foundry testing of the chip to select a digital value to be stored in block 244 (of FIG. 2B). Alternatively, these components can be implemented in the same chip or chip-set as the DAC 242, ADC 216 and timing controller 208, and the digital value stored in the block 244 (of FIG. 2B) can be selectively updated from time to time to compensate for makeup, grease, scratches, and the like, that collect on the cover plate 124. For example, assuming that the optical sensor is part of a subsystem that is used in a larger system, the value stored in block 244 (of FIG. 2B) can be automatically updated periodically, or on-demand, so long as no object 122 is within the sense region of the optical sensor. One of the optical sensors described herein can be included in a system (e.g., a mobile phone) for proximity detection, along with a further optical sensor that performs ambient light detection. In accordance with an embodiment, if an optical proximity sensor is not detecting an object within its sense region, while at the same time the optical ambient light sensor detects ambient light beyond a predetermined threshold, the system can determine that it is an appropriate time period during which the value used to generate the offset signal (e.g., the value stored in block 244 of FIG. 2B) can be automatically updated. Other variations are also possible and within the scope of the present invention.

The timing controller 208 can also provide the TX signal to the ADC 216, so that the ADC 216 is synchronized with the light source 104. For example, if the ADC 216 includes an up/down counter, the timing controller 208 can also provide a binary up/down control signal, which specifies when the counter should count up, and when the counter should count down. Additionally, the timing controller 208 can provide other timing control signals to components of the ADC 216.

In the embodiments described above with reference to FIGS. 2A-2C, the interference light offset compensation is performed by combining analog current signals. In those embodiments, the ADC 216 accepts a current input, and the DAC 242 generates a current output. In alternative embodiments, the interference light offset compensation can be performed by combining analog voltage signals. For example, referring to FIG. 2D, the current detection signal produced by the light detector 114 is converted to a voltage detection signal by a transimpedance amplifier (TIA) 264. Additionally, in FIG. 2D, the output of the DAC 262 is a voltage signal, which can be expressed as Voff*TX. This voltage signal output by the DAC 262 is combined with the voltage detection signal (Vdiode) by a summing amplifier 266, which in this instance determines a difference between its two input signals, to thereby generate a voltage compensated detection signal (Vcomp). The voltage compensated detection signal (Vcomp) is converted to a digital signal by an ADC 276 that accepts a voltage signal at its input. It is also within the scope of the present invention to use a light detector that generates a voltage (instead of a current) indicative of a magnitude of the light incident on the light detector, which would eliminate the need for the TIA 264.

In the embodiments described above with reference to FIGS. 2A-2D, the interference light offset compensation is performed in the analog domain, i.e., by combining analog signals. This results in the compensated detection signal (Icomp or Vcomp) being provided to the input of the ADC (216 or 276).

Figure 2E:
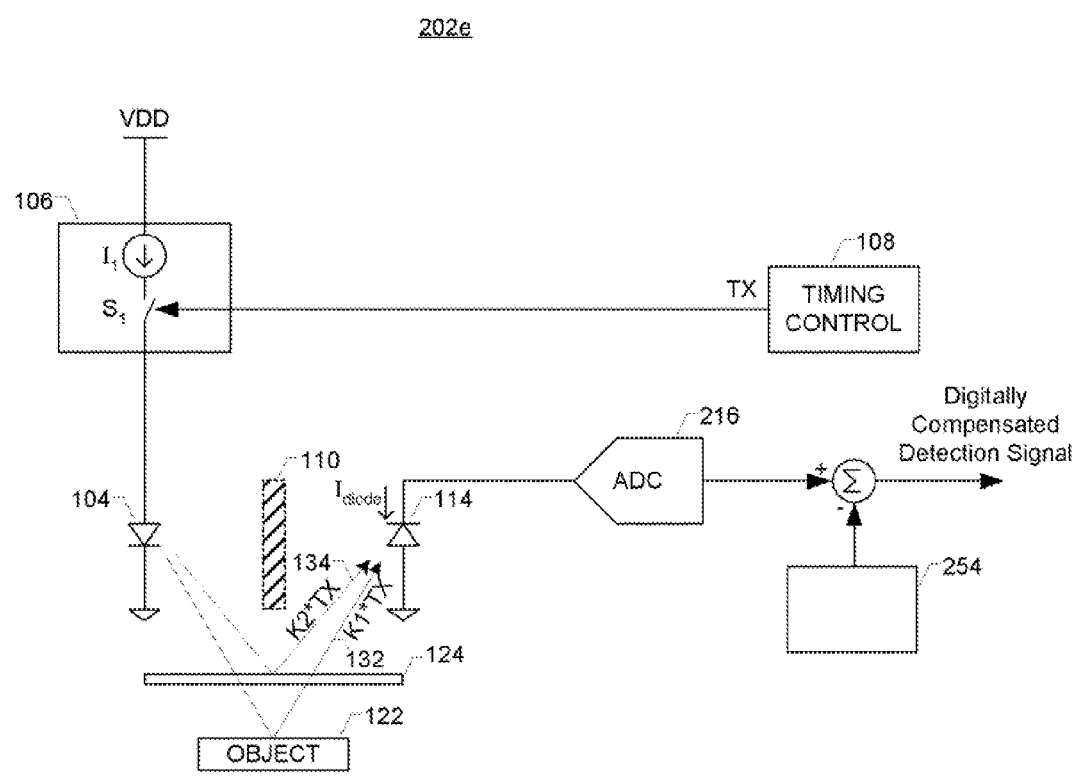
FIG. 2E shows an embodiment of an optical proximity sensor that achieves some of the benefits of the embodiments of FIGS. 2A-2D, but is believed to be inferior.

Alternatively, it is possible that the interference light offset compensation can be performed in the digital domain, i.e., following conversion by an ADC of an analog detection signal (Idiode or Vdiode) to a digital detection signal. In other words, the interference light offset compensation can be performed by combining digital signals, i.e., by subtracting a digital offset compensation signal from a digital detection signal. An example of such an alternative is shown in FIG. 2E. While performing the interference light offset compensation in the digital domain can be used to compensate for at least some of the interference light, such embodiments would require a higher resolution and increased dynamic range ADC, which would increase the cost and power requirements of the optical sensor, and may increase the physical size of the optical sensor. For example, assume that there is a desire/requirement to produce a compensated detection signal having 8 bits of resolution, i.e., 256 different codes or "counts". Also assume that interference light can be up to four times (4×) greater than the ADC full-scale, which is equivalent to two full-bits of resolution of the ADC. More specifically, assume that the interference light causes an offset count of 192, enabling the system to only resolve 64 different counts (i.e., 256−192=64). This is a reduction in 2 bits of system resolution. Accordingly, if the interference light offset compensation is performed in the digital domain (i.e., following the analog-to-digital conversion by the ADC 216 or 276), then the ADC 216 (or 276) would require an additional 2 bits of resolution (i.e., a 10 bit ADC 216 or 276 would be needed), to achieve the desired 8 bits of system resolution. However, increasing the size of the ADC is undesirable because it typically increases the cost and power requirements of the ADC and typically increases the physical size of the ADC. Additionally, the higher the resolution of the ADC, typically the more time it takes for an analog-to-digital conversion to be performed (typically, the addition of each bit will double the conversion time of a charge balancing ADC). Accordingly, performing the interference light offset compensation in the digital domain (e.g., as shown in FIG. 2E), is believed to be inferior to performing the interference light offset compensation in the analog domain as was described above with reference to FIGS. 2A-2D.

In the above described embodiments, and the embodiments described below, the light detector 114 is generally described as being a photodetector that generates an analog detection signal (e.g., a current) that is indicative of the intensity of the light incident on the light detector 114. However, it is noted that the light detector can also include additionally analog signal processing and/or buffer circuitry, such as an analog-front-end (AFE), a current buffer and/or a filter, but not limited thereto. Collectively, such circuitry can be adapted to produce the analog detection signal indicative of the intensity of the light incident on the light detector. It is also noted that there can be analog processing and/or filtering circuitry that processes and/or filters the analog compensated detection signal (e.g., Icomp) produced by combining the analog offset signal (e.g., Koff*TX) with the analog detection signal (e.g., Idiode) before the analog compensated detection signal (e.g., Icomp) is converted to a digital signal by the ADC 216. Whether or not the analog compensated detection signal is processed and/or filtered before being converted to a digital signal, the signal being provided to the ADC 216 will simply be referred to as the analog compensated detection signal.

Figure 3A:
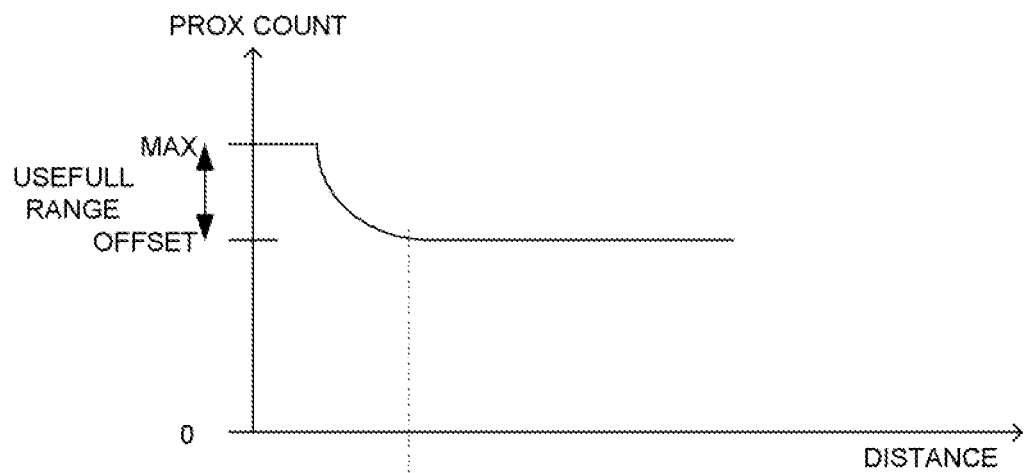
FIGS. 3A and 3B are exemplary graphs illustrating proximity count versus distance, which are used to illustrate how embodiments of the present invention can be used to improve the usable range and detection distance of an optical proximity sensor.
Figure 3B:
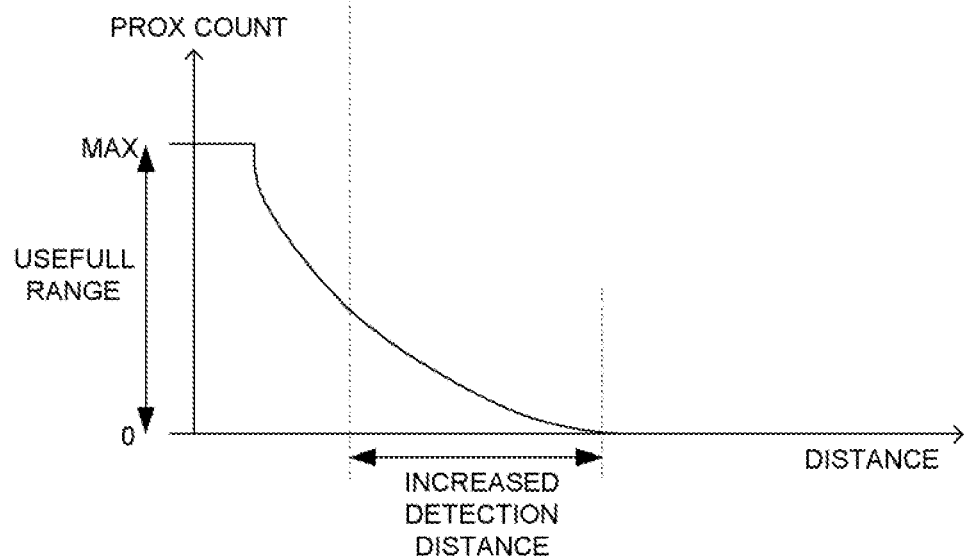

FIG. 3A is an exemplary graph that illustrates proximity count versus distance for the optical sensor 102 of FIG. 1, which does not include the offset compensation according to embodiments of the present invention. The proximity count represents an output of the ADC 116. The offset shown in FIG. 3A adversely affects (i.e., reduces) the useful range of the optical sensor. The extent of the offset is dependent on the extent of the interference light. For example, the offset would most likely be largest if a barrier (e.g., 110) between the light source and light detector was not present. FIG. 3B is an exemplary graph that illustrates proximity count versus distance for an optical sensor that includes the analog offset compensation (e.g., one of the optical sensors 202a-202d) according to an embodiment of the present invention. In FIG. 3B the proximity count represents an output of the ADC 216 or 276. Notice how in FIG. 3B the usable range of the optical sensor is increased, as is the detection distance, as compared to FIG. 3A. As mentioned above, in certain embodiments, rather than completely removing the offset, as shown in FIG. 3B, embodiments of the present invention can be used to reduce the offset to a predetermined amount (e.g., a target offset).

Since proximity sensors are meant to operate in a user environment that includes ambient light, such sensors should preferably be able to detect weak signals (for lower power operation and/or for longer distance detection) even in the presence of strong ambient light. However, the photo current generated by ambient light in such sensors often overwhelm the sensors. This results in sensors that may be prone to falsely trigger, or not trigger when the should, due to strong ambient light interference.

Some conventional techniques for attempting to reject ambient light use a preamplifier amplifier with a high-pass resistance-capacitance (RC) network provided at an input of the preamplifier, to pass the high frequency components of a signal while blocking the low frequency components. However, this solution has two major drawbacks. First, a very large resistor and a very large capacitor are required to achieve the low cutoff frequency, which is undesirable because such passive components occupy a very large chip area and are sensitive to parasitic-coupled noise. Second, the voltage across the resistor varies with the average photo current, which causes the preamplifier's common-input (and therefore the overall performance) to be directly affected by the ambient light level. Another technique that has been used includes an active feedback loop around the preamplifier. In this configuration, the ambient light rejection is achieved by using analog level detection based on the peaks of the photo current signal.

However, this technique assumes that the average current is constant, requires a reset mechanism and has a very low speed operation.

In accordance with specific embodiments of the present invention, in order to reject ambient light, the ADC 216 includes an analog-to-digital-to-analog (ADA) conversion feedback loop. Details of such an ADC will now be described with reference to FIGS. 4 and 5.

Referring to FIG. 4, an ADC 416 with feedback is shown, which can be used to implement the ADC 216 shown in FIGS. 2A-2C. The ADC 416 includes an N-bit forward path including an N-bit ADC 414. The ADC 416 also includes an M-bit feedback loop used to reject ambient light via direct photodiode current processing. The feedback loop includes an M-bit ADC 424 and an M-bit DAC 430. The feedback loop may be referred to as an ADA feedback loop, because it includes an analog-to-digital-to-analog (ADA) conversion. Thus, the ADC 416 can be referred to as an ADC with ADA feedback. The output of the N-bit ADC 414 of the forward path provides the N-bit output of the ADC 416, which can be the N-bit output of ADC 216 in FIGS. 2A-2C. In accordance with an embodiment of the present invention M<N (e.g., M=7 and N=8). However, it is also within the scope of the present invention that M=N, or that M>N. As will be appreciated from the description herein, the N-bit ADC with the M-bit ADA feedback loop is used to reject ambient light and increase the dynamic range and sensitivity of proximity sensing. Some of the advantages of using the ADA feedback loop, over using an analog feedback loop, includes higher speed/faster operation, smaller silicon size, and lower noise.

Figure 6:
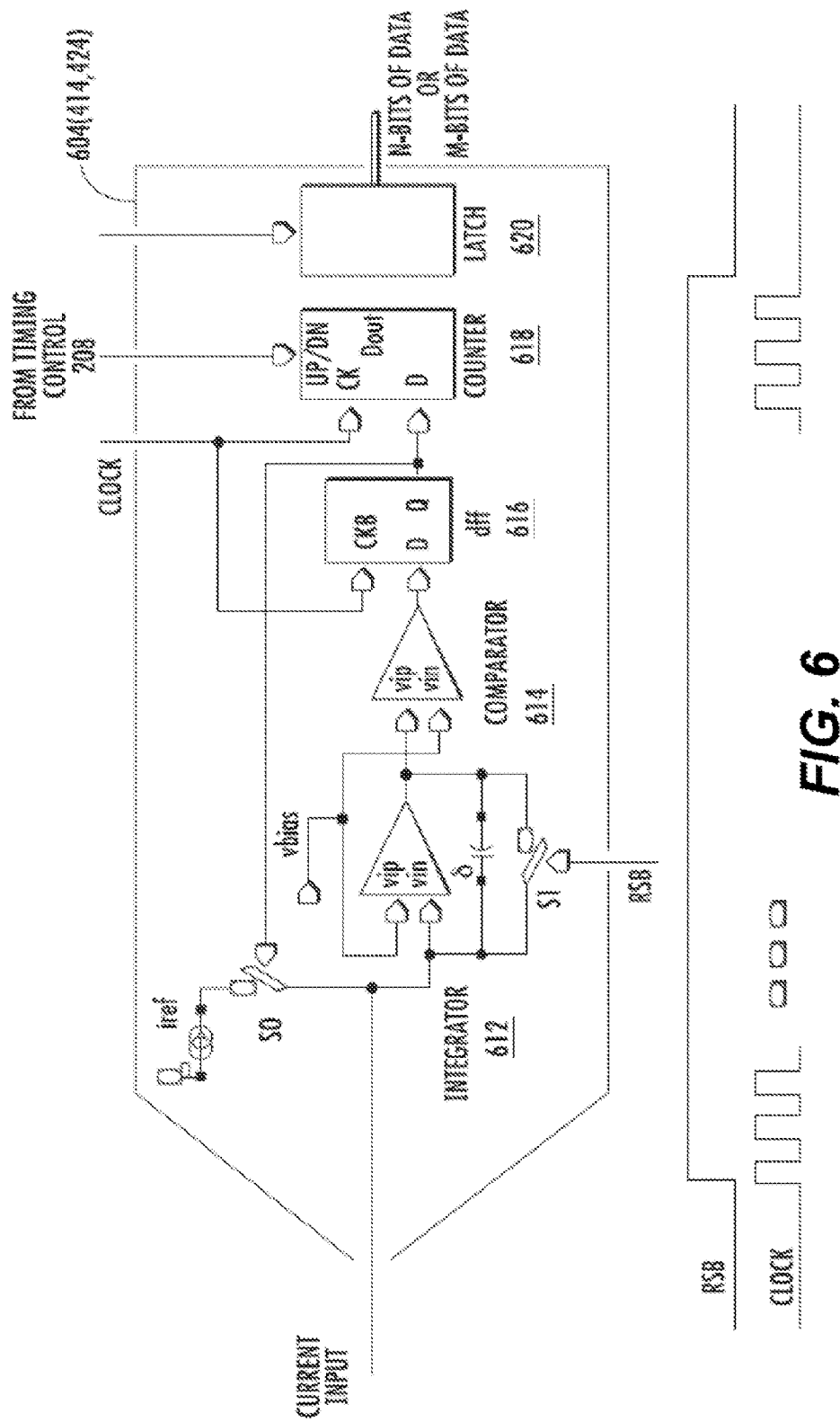
FIG. 6 shows how the N-bit and M-bit ADCs, within the ADC with ADA feedback of FIG. 4, can be implemented, along with a corresponding possible timing diagram.

In accordance with an embodiment, the M-bit ADC 424 and the M-bit DAC 430 have a same full-scale reference current to reduce and preferably remove effects of gain errors in the M-bit ADC 424 and the M-bit DAC 430. The M-bit ADC 424 can be implemented using a charge balanced ADC, an example of which is shown in FIG. 6, but is not limited thereto. The M-bit DAC 430 can be implemented, e.g., using M-bit binary weighted current sources, in order to save circuit size, but is not limited thereto. The N-bit ADC 414 can also be implemented using a charge balanced ADC, an example of which is shown in FIG. 6, but with a different full-scale reference current than the M-bit ADC 424, but is not limited thereto. For the following discussion, it will be assumed that each ADC includes a counter (e.g., up/down counter 618 in FIG. 6), with the output of the counter being the output of the ADC. This can be better understood from the discussion of FIG. 6, later below.

FIGS. 5(a), (b), (c) and (d), which can collectively be referred to as FIG. 5, show a timing diagram of signal processing for a proximity detection according to an embodiment of the present invention that uses the ADC with ADA feedback. Reference is also made to components within FIGS. 2A-2C and 4 when explaining the timing diagram of FIGS. 5(a), (b), (c) and (d).

FIG. 5(a) illustrates the timing of the M-bit ADC 424, the M-bit DAC 420 and the N-bit ADC 414 of the N-bit ADC with the M-bit ADA feedback loop 416 (which can be used to implement the ADC 216), as well as the timing of the driver 206. FIG. 5(b) illustrates the timing of an analog detection current $I_{diode}$, without any compensation for the interference light FIG. 5(c) illustrates the timing of an analog compensated detection current $I_{diode}-K_{off}*TX$, which includes compensation for the interference light. FIG. 5(d) illustrates the timing of a current $I_{adc}$ that is converted to N-bits by the N-bit ADC 414 and converted to M-bits by the M-bit ADC 424. As can be appreciated from FIGS. 4 and 5, when the M-bit DAC 430 is off and the interference light compensation is off the $I_{adc}=I_{diode}$, and when the M-bit DAC 430 is on and the interference light compensation is on the $I_{adc}=I_{diode}-K_{off}*TX-I_{dac}$, where $I_{dac}$ is the output of the M-bit DAC 430 in FIG. 4 and $K_{off}*TX$ is the magnitude of the interference light compensation.

During a time period t1 (when the M-bit ADC 424 is on, the M-bit DAC 430 is off, the N-bit ADC 414 is off, and the driver 206 is not driving the light source 104), the light detector 114 produces a photodiode current $I_{diode}$ in response to ambient light, and the M-bit ADC 424 converts $I_{diode}$ into an M-bit code (during this time TX=0, and thus, $I_{diode}-K_{off}*TX=I_{diode}$). This results in the current $I_{adc}$ (in FIG. 4) being substantially the same as $I_{diode}$ during the time period t1, as can be appreciated from FIG. 5. While the M-bit ADC 424 is on it converts the analog photocurrent received at its input into digital data, which are latched at the end of the conversion time (e.g., by latch 620 in FIG. 6), and provided at the output of the M-bit ADC 424 (even after the M-bit ADC 424 is changed from on to off). At the same time the M-bit ADC 424 is on and performing its conversion: the M-bit DAC 430 is off and its output is zero; and the N-bit ADC 414 is off, not performing a conversion and its output is zero.

During time periods t2, t3 and t4 (during which the M-bit ADC 424 is off, and the M-bit DAC 430 is on), the M-bit DAC 430 receives at its digital input the M-bit code output by the M-bit ADC 424 at the end of the time period t1, and based on that M-bit code, the M-bit DAC 430 outputs an analog current $I_{dac}$ that is indicative of the ambient light detected during the time period t1.

Referring to FIGS. 5(a) and 5(b), during the time period t2, the driver 206 is driving the light source 104, which causes $I_{diode}$ to be indicative of both ambient light detected by the light detector 114, IR light from the light source 104 reflected off an object 122 and detected by the light detector 114, as well as interference light detected by the light detector. Referring to FIGS. 5(a) and 5(c), during the time period t2, $I_{diode}-K_{off}*TX$ is indicative of both ambient light detected by the light detector 114 and IR light from the light source 104 reflected off an object 122 and detected by the light detector 114. Also, during the time period t2, the N-bit ADC 414 is on and counting up.

During the time period t3, even though the driver 206 is no longer driving the light source 104, the N-bit ADC 414 is still on and still counting up. The benefits of this are explained below.

During the time period t4 (which is preferably as long as the time period t2 plus the time period t3), the driver 206 is not driving the light source 104, which causes $I_{diode}-K_{off}*TX$ (where TX=0) to be only indicative ambient light detected by the light detector 114. Also, during the time period t4, the N-bit ADC 414 is on and counting down.

As can be seen in FIG. 5(d), during the time periods t2, t3 and t4, $I_{adc}=I_{diode}-K_{off}*TX-I_{dac}$. This enables the N-bit ADC 414 to process the signal $I_{adc}=I_{diode}-K_{off}*TX-I_{dac}$ during two time slots during which the M-bit DAC 430 is on. During one time slot, the N-bit ADC 414 counts (converts) up while light source 104 is on at least a portion of the time slot; and during another time slot, the N-bit ADC 414 counts (converts) down while light source 104 is off. In accordance with an embodiment, the light source 104 is turned on (e.g., driven by the driver 206) for only a portion of the time (e.g., half the time) that the N-bit ADC is counting up, to compensate for potential delays of the light source driver timing, to thereby ensure that the light detector 114 only detects light (originating from the light source) reflected off an object while the N-bit ADC 414 is counting up. Stated another way, in accordance with an embodiment, the N-bit ADC 414 counts up for an amount of time (i.e., for both time periods t2 and t3) that is longer than an amount of time that the light source 104 is turned on (i.e., only time period t2), to make sure that the N-bit ADC 414 is counting up the entire time that the photo detector 202 detects light (originating from the light source 104) reflected off an object 122.

The N-bit ADC 414 outputs N-bits of data after the completion of the counting up and down, which is indicative of (e.g., directly proportional to) the photodiode current $I_{diode}$−$K_{off}$*TX component resulting from the light (originating from the light source 104) reflected off an object, and is independent of the difference between the photodiode current generated by ambient light and the output current from the M-bit DAC 424, i.e., the residue from the ADA feedback loop. The proximity detection speed, including the completion of ADA feedback loop and the up/down counting of the N-bit ADC 414, is much faster than the proximity detection speed possible when using traditional transimpedance amplifier techniques to reject ambient light.

In summary, the ADA feedback loop greatly increases the signal dynamic range of proximity sensing. The counting up and down scheme of the N-bit ADC 414, with specific light source timing, greatly increases the sensitivity of proximity sensing by reducing the effect of the residue from the ADA feedback loop.

Additional details of an ADC 414 the ADA feedback loop are provide in commonly assigned U.S. patent application Ser. No. 12/716,220, entitled "Proximity Sensors with Improved Ambient Light Rejection", filed Mar. 2, 2010, by Xijian Lin, which has been incorporated herein by reference.

FIG. 6 shows how the N-bit ADC 414 and the M-bit ADC 424, within the ADC with ADA feedback 404 of FIG. 4, can be implemented as charge balancing ADCs, along with a corresponding exemplary timing diagram. As shown in FIG. 6, each ADC can include an integrator 612, a comparator 614, a D flip-flop (dff) 616, a counter 618, and a latch 620. For the N-bit ADC 414, the counter 618 should preferably be an up/down counter, so that the counter can be used to perform a subtraction function. For the M-bit ADC 424, the counter need only count in one direction, e.g., up.

For each analog-to-digital conversion with N bits, performed by the N-bit ADC 414, $2^N$ clock periods are needed. During each conversion time, the number of 1s from the dff 616 are counted, and a charge of Tclock*Iref is delivered to the integrator 612 for each corresponding 1. Here, Tclock is the clock period and Irefn is the reference current associated with the N-bit ADC 414. According to charge conservation:

$$Iadc*Tclock*2^N = Irefn*Tclock*DataN \quad \text{(Equation 1A).}$$

Here, Iadc is the current at the input of the ADC, and DataN is the counter's output at the end of an analog-to-digital conversion time, as latched by the latch 620. The left side of the equation represents the total charge removed from the integrator by the input current, and the right side represents the total charge delivered to the integrator by the reference current. From Equation 1A, the digital output (DataN) of the N-bit ADC 414 can be expressed as:

$$DataN = (Iadc1/Irefn)*2^N - (Iadc2/Irefn)*2^N \quad \text{(Equation 1B)}$$
$$= [(Iadc1 - Iadc2)/Irefn]*2^N.$$

In Equation 1B, Iadc1 is the average current at the input of the N-bit ADC 414 while the N-bit ADC 414 is on and counting up, and Iadc2 is the average current at the input of the N-bit ADC 414 while the N-bit ADC 414 is on and counting down.

Similarly, for each data (i.e., analog to digital) conversion with M bits, performed by the M-bit ADC 424, $2^M$ clock periods are needed. During each conversion time, the number of 1s from the dff 616 are counted, and a charge of Tclock*Irefm is delivered to the integrator 612 for each corresponding 1. Here, Tclock is the clock period and Irefm is the reference current associated with the M-bit ADC 424. According to charge conservation:

$$Iadc*Tclock*2^M = Irefm*Tclock*DataM \quad \text{(Equation 1C).}$$

From Equation 1C, the digital output (DataM) of the M-bit ADC 424 can be expressed as:

$$DataM = (Iadc/Irefm)*2^M \quad \text{(Equation 1D).}$$

In Equation 1D, Iadc is the average current at the input of the M-bit ADC 424 while the M-bit ADC 424 is on and counting up.

In accordance with an embodiment, various portions of N-bit ADC 414 and the M-bit ADC 424 can be shared, to reduce the size of the circuit, and thus a chip size. For example, the integrator 612, the comparator 614, and the dff 616, and the counter 618, or at least portions thereof, can be shared. Timing control circuits can also be shared.

To reject ambient light, additionally, or alternatively, an optical IR rejection filter can be placed over the light detector 114. Such an IR rejection filter may be incorporated into or onto the cover plate 124, or can be below and/or above the cover plate 124. Other known as well as future developed techniques for rejecting ambient light can be used with the embodiments of FIGS. 2A-2D.

Figure 7:
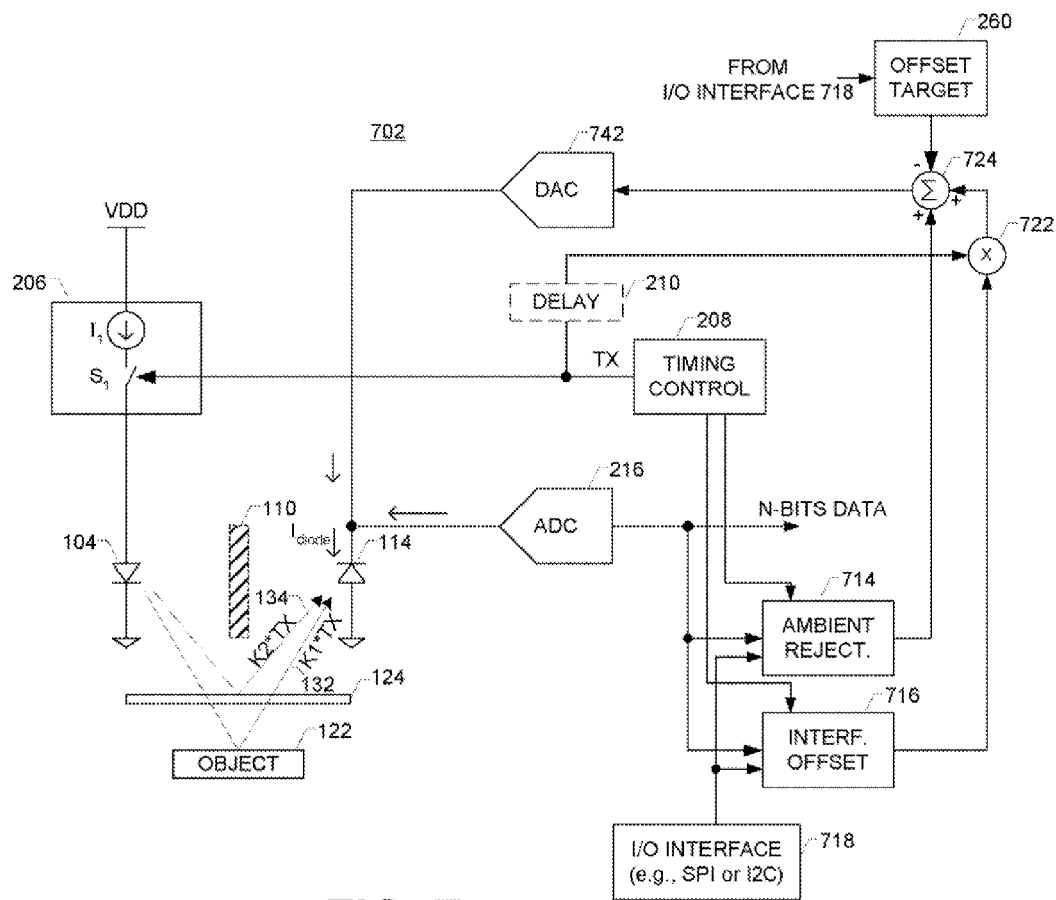
FIG. 7 illustrates an optical proximity sensor according to a further embodiment of the present invention.

In FIGS. 4 and 5, the current generated by the DAC 430 within the ADC 416 is referenced as Idac. By contrast, in FIGS. 4 and 5, as well as FIGS. 2B and 2C, the current generated by the DAC 242 is referenced as Koff*TX. In such embodiments, Idac is used to rejection ambient light, and Koff*TX is used to compensate for interference light. In the embodiment of FIG. 7, discussed below, a DAC 742 produces an analog offset signal that is used to both reject ambient light and compensate for interference light.

Referring now to FIG. 7, an optical sensor 702 according to an embodiment of the present invention includes a DAC 742 that can be used to convert stored digital values to an analog offset signal that is both used to compensate for interference light, as well as to reject ambient light. Such digital values can be stored in registers, random access memory (RAM), or some other storage device(s), which is/are collectively represented by blocks 714 and 716. The stored values can be programmed and reprogrammed as desired, e.g., using a bus, such as, but not limited to, an SP1 or I2C bus, and/or using digital interface 718. Referring to FIG. 7, a first loop including the ADC 216, the ambient rejection block/register 714, a summer 724 and the DAC 742 is used to store (in block 714) a digital value indicative of a magnitude of ambient light, as detected by the light detector 114, when the light source 104 is not being driven by the driver 206. A second loop including the ADC 216, the interference offset block/register 716, a multiplier 722, the summer 724 and the DAC 742, is used to store a digital value indicative of a magnitude of interference light, as detected by the light detector 114, when the light source 104 is being driven by the driver 206. Through use of these two loops, the offset compensation signal output by the DAC 742 is used to compensate for interference light, as well as to reject ambient light.

Figure 8:
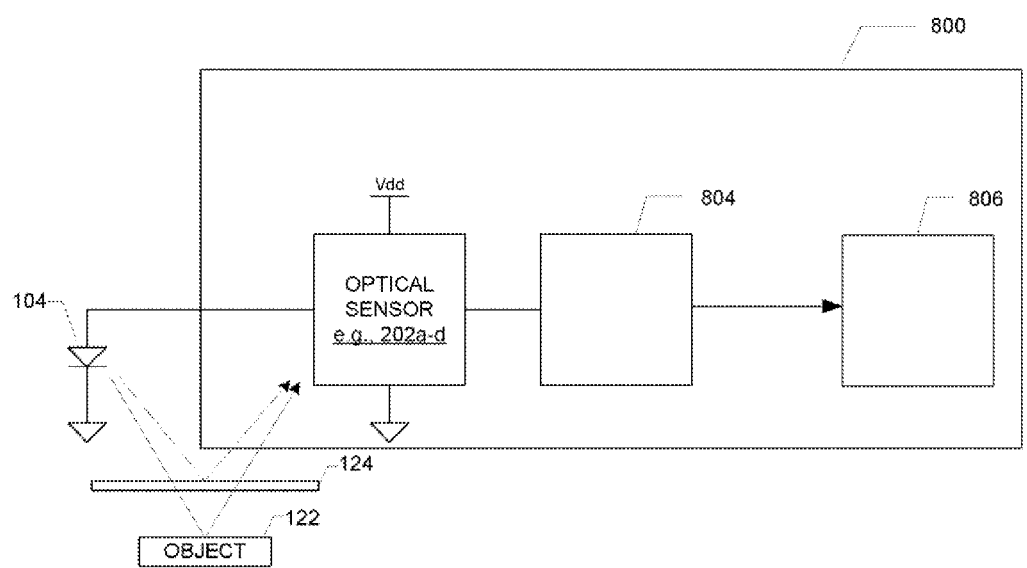
FIG. 8 is a high level block diagram of a system according to an embodiment of the present invention.

Optical sensors of embodiments of the present invention can be used in various systems, including, but not limited to, mobile phones, tablets, personal data assistants, laptop computers, netbooks, other handheld-devices, as well as non-handheld-devices. Referring to the system 800 of FIG. 8, for example, the optical sensor (e.g., one of 202a-202d) can be used to control whether a subsystem 806 (e.g., a touch-screen, display, backlight, virtual scroll wheel, virtual keypad, navigation pad, etc.) is enabled or disabled. For example, the optical sensor can detect when an object, such as a person's finger, is approaching, and based on the detection either enable (or disable) a subsystem 806. More specifically, an output of the optical sensor (e.g., one of 202a-202d) can be provided to a comparator or processor 804 which can, e.g., compare the output of the optical sensor to a threshold, to determine whether the object is within a range where the subsystem 806 should be enabled (or disabled, depending on what is desired). Multiple thresholds (e.g., stored digital values) can be used, and more than one possible response can occur based on the detected proximity of an object. For example, a first response can occur if an object is within a first proximity range, and a second response can occur if the object is within a second proximity range. Exemplary responses can include starting or stopping, or enabling or disabling, various system and/or subsystem operations.

Embodiments of the present invention, which are described above, can be used to reduce and potentially eliminate the adverse affects that interference light (and ambient light) may have on an optical sensor. As explained above, interference light may be caused by specular reflections and/or other internal reflections and/or light leaking under, over and/or through a barrier (e.g., 110). Embodiments of the present invention can be used to compensate for imperfections in a light barrier (e.g., 110), which may occur during manufacture of the light barrier, and/or may result from the system including the optical sensor being dropped or otherwise jolted, which may damage or dislodge the light barrier. As mentioned above, embodiments of the present invention can also be used to eliminate the need for any light barrier at all. While embodiments of the present invention can be used to reduce the adverse affects of specular reflections caused by a cover plate (e.g., 124), it is noted that optical sensors according to embodiments of the present invention can be used without a cover plate.

Figure 9:
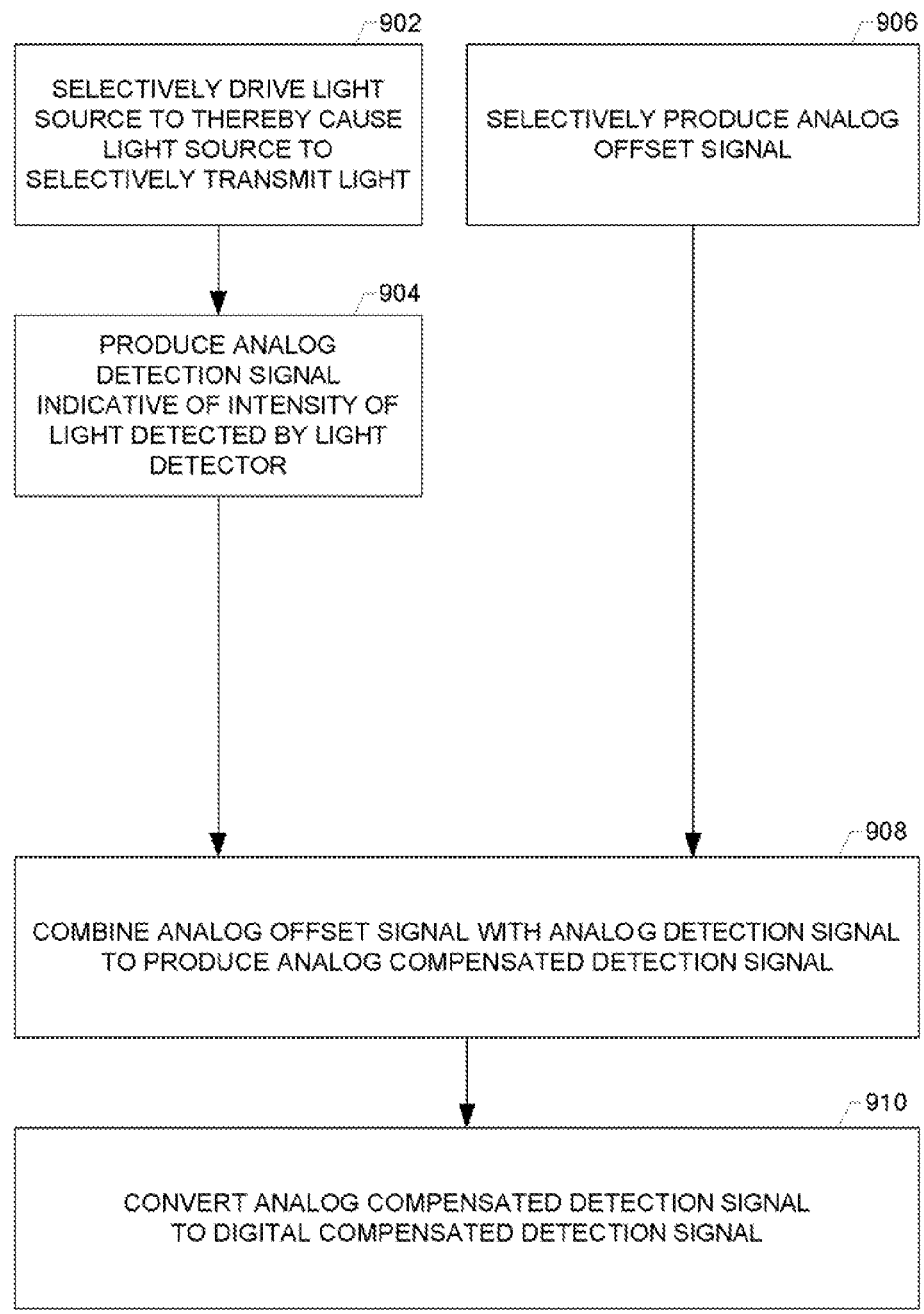
FIG. 9 is a high level flow diagram of used to summarize methods according to various embodiments of the present invention.

FIG. 9 is a high level flow diagram use to summarize methods according to various embodiments of the present invention. Such a method is for use with an optical sensor, including a light source and a light detector, which can be used to detect the presence, proximity and/or motion of an object within the sense region of the optical sensor. Referring to FIG. 9, at step 902, a light source is selectively driven to thereby cause the light source to selectively transmit light. At step 904, an analog detection signal is produced, which is indicative of an intensity of light detected by the light detector. As explained above, the light detected by the light detector can include light transmitted by the light source that was reflected off an object within the sense region of the optical sensor (presuming there is an object within the sense region). Additionally, the light detected by the light detector can include interference light, which includes light transmitted by the light source, and detected by the light detector, that was not reflected off an object within the sense region of the optical sensor. As explained above, the interference light may be caused by specular reflections and/or other internal reflections and/or light leaking under, over and/or through a barrier. If there is no light barrier present between the light source and the light detector, the interference light can include light transmitted directly from the light source to the light detector. Additionally, the light detected by the light detector can include ambient light. At step 906, an analog offset signal (e.g., an analog offset current) is produced. As was described above, e.g., with reference to FIGS. 2A-2D, the analog offset signal can be used to compensate for at least a portion of (and preferably, a majority, most or all of) the interference light included in the light detected by the light detector. Additionally, as was described above, e.g., with reference to FIG. 7, the analog offset signal can also be used to reject at least a portion of (and preferably, a majority, most or all of) the ambient light included in the light detected by the light detector. At step 908, the analog offset signal is combined with the analog detection signal to produce an analog compensated detection signal (also referred to as the analog offset compensated detection signal). At step 910, the analog compensated detection signal is converted to a digital signal by an ADC. As was described above, e.g., with reference to FIGS. 4-6, ambient light can be rejected as part of the analog to digital conversion, e.g., using an ADA loop. Methods of embodiments of the present invention also relate to selecting and updating the analog offset signal and/or the digital value used to generate the analog offset signal.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The breadth and scope of the present invention should not be limited by any of the above-described exemplary embodiments, but should be defined only in accordance with the following claims and their equivalents.

What is claimed is:

1. An optical proximity sensor used to detect the presence, proximity and/or motion of an object within a sense region of the optical proximity sensor, comprising:

a driver that selectively drives a light source to transmit light;

a light detector that produces an analog detection signal indicative of an intensity of light detected by the light detector, wherein the light detected by the light detector includes light transmitted by the light source that reflected off an object within the sense region of the optical proximity sensor, interference light, which comprises light transmitted by the light source, and detected by the light detector, that did not reflect off an object within the sense region of the optical proximity sensor, and ambient light;

an offset signal generator that selectively produces an analog offset signal that is combined with the analog detection signal produced by the photodetector to produce an analog compensated detection signal; and an analog-to-digital converter (ADC) that converts the analog compensated detection signal to a digital compensated detection signal;

wherein the analog offset signal compensates for at least a portion of the interference light included in the light detected by the light detector; and wherein a dynamic range of the ADC is increased by the analog offset signal being combined with the analog detection signal to produce the analog compensated detection signal upstream of the ADC, compared to if the analog offset signal is not combined with the analog detection signal to produce the analog compensated detection signal upstream of the ADC.

2. The optical proximity sensor of claim 1, further comprising:
a timing controller that produces a transmit signal that is used to synchronize the offset signal generator's selective producing of the analog offset signal with the driver's selective driving of the light source, so that the analog offset signal is produced at the same time that the light source transmits light.

3. The optical proximity sensor of claim 1, wherein: the digital compensated detection signal output by the ADC is indicative of a proximity of an object to the light detector with at least a majority of the ambient light detected by the light detector rejected, and with at least a majority of the interference light compensated for.

4. The optical proximity sensor of claim 3, wherein:
the offset signal generator includes a digital-to-analog converter (DAC) that outputs the analog offset signal; and
the DAC of the offset signal generator receives a digital signal indicative of a magnitude of the interference light.

5. The optical proximity sensor of claim 1, wherein:
the offset signal generator includes a digital-to-analog converter (DAC) that outputs the analog offset signal;
the DAC of the offset signal generator receives a digital signal indicative of a magnitude of the interference light and a magnitude of the ambient light; and
the analog offset signal, output by the DAC of the offset signal generator, also rejects at least a portion of the ambient light included in the light detected by the light detector.

6. The optical proximity sensor of claim 3, wherein:
the ADC is an ADC with analog-to-digital-to-analog (ADA) feedback.

7. The proximity sensor of claim 6, wherein the ADC with the ADA feedback comprises:
an M-bit ADC adapted to
receive a first analog signal indicative of an intensity of ambient light detected by the light detector during a first period of time when the light source is not driven to transmit light, and
convert the first analog signal to M-bits of data indicative of the intensity of ambient light detected by the light detector during the first period of time when the light source is not driven to transmit light;
an M-bit digital-to-analog converter (DAC) adapted to
receive the M-bits of data, produced by the M-bit ADC, which are indicative of the intensity of ambient light detected by the light detector during the first period of time when the light source is not driven to transmit light, and
convert the M-bits of data to a second analog signal indicative of the intensity of ambient light detected by the light detector during the first period of time when the light source is not driven to transmit light; and
an N-bit ADC adapted to
receive a third analog signal indicative of an intensity of light detected by the light detector during a further period of time with the second analog signal produced by the M-bit DAC subtracted therefrom, and
convert the third analog signal to N-bits of data, which is the digital offset compensated detection signal output by the ADC with ADA feedback;
wherein during a portion of the further period of time the light source is driven to transmit light, and during another portion of the further period of time the light source is not driven to transmit light.

8. The proximity sensor of claim 7, wherein:
the portion of the further period of time during which the light source is driven to transmit light is shorter than the another portion of the further period of time during which the light source is not driven to transmit light; and
the N-bit ADC includes an up-down counter that counts up during part of the further period of time at least a portion of which the light source is driven to transmit light, and counts down during a remainder of the further period of time, to thereby produce a count value, wherein the count value at the end of the further period of time is the N-bits of data indicative of a proximity of an object to the light detector with at least a majority of ambient light detected by the light detector rejected, and with at least a majority of the interference light compensated for.

9. The optical proximity sensor of claim 1, wherein there is no opaque barrier, between the light source and the light detector, configured to optically isolate the light source from the light detector.

10. A method for use with an optical proximity sensor, including a light source and a light detector, used to detect the presence, proximity and/or motion of an object within the sense region of the optical proximity sensor, the method comprising:
(a) selectively driving the light source to thereby cause the light source to selectively transmit light;
(b) producing an analog detection signal indicative of an intensity of light detected by the light detector, wherein the light detected by the light detector includes
light transmitted by the light source that reflected off an object within the sense region of the optical proximity sensor,
interference light, which comprises light transmitted by the light source, and detected by the light detector, that did not reflect off an object within the sense region of the optical proximity sensor, and
ambient light;
(c) producing an analog offset signal;
(d) combining the analog offset signal with the analog detection signal to produce an analog compensated detection signal; and
(e) converting the analog compensated detection signal to a digital compensated detection using an analog-to-digital converter (ADC);
wherein the analog offset signal compensates for at least a portion of the interference light included in the light detected by the light detector; and
wherein the analog offset signal is combined with the analog detection signal to produce the analog compensated detection signal prior to the converting at step (e), which increases a dynamic range of the ADC used to perform the converting at step (e) compared to if the analog offset signal is not combined with the analog detection signal to produce the analog compensated detection signal prior to the converting at step (e).

11. The method of claim 10, wherein step (c) comprises:
(c.1) storing a digital value; and
(c.2) converting the digital value to the analog offset signal.

12. A method for use with an optical proximity sensor, including a light source and a light detector, used to detect the presence, proximity and/or motion of an object within the sense region of the optical proximity sensor, the method comprising:
(a) selectively driving the light source to thereby cause the light source to selectively transmit light;

(b) producing an analog detection signal indicative of an intensity of light detected by the light detector, wherein the light detected by the light detector includes
light transmitted by the light source that reflected off an object within the sense region of the optical proximity sensor,
interference light, which comprises light transmitted by the light source, and detected by the light detector, that did not reflect off an object within the sense region of the optical proximity sensor, and
ambient light;
(c) producing an analog offset signal; and
(d) combining the analog offset signal with the analog detection signal to produce an analog compensated detection signal; and
wherein the analog offset signal compensates for at least a portion of the interference light included in the light detected by the light detector; and
wherein step (c) comprises:
(c.1) storing a first digital value for use in compensating for the interference light;
(c.2) storing a second digital value for use in rejecting the ambient light; and
(c.3) converting the first and second digital values to the analog offset signal;
wherein the analog offset signal compensates for at least a portion of the interference light, and rejects at least a portion of the ambient light, included in the light detected by the light detector.

13. The method of claim 10, wherein step (e) comprises:
(e.1) producing a first analog signal indicative of an intensity of light detected by the light detector during a first period of time when the light source is not driven to transmit light;
(e.2) converting the first analog signal to M-bits of data indicative of the intensity of light detected by the light detector during the first period of time when the light source is not driven to transmit light;
(e.3) converting the M-bits of data to a second analog signal indicative of the intensity of the light detected by the light detector during the first period of time when the light source is not driven to transmit light;
(e.4) producing a third analog signal indicative of an intensity of light detected by the light detector during a further period of time with the second analog signal produced by the M-bit DAC subtracted therefrom; and
(e.5) converting the third analog signal to N-bits of data, which is the digital offset compensated detection signal;
wherein during a portion of the further period of time the light source is driven to transmit light, and during another portion of the further period of time the light source is not driven to transmit light.

14. The method of claim 13, wherein step (c) comprises:
(c.1) subtracting an offset target value from values of the digital compensated detection signal to produce a target offset digital compensated detection signal;
(c.2) digitally filtering the target offset digital compensated detection signal to thereby produce a filtered target offset digital compensated detection signal; and
(c.3) converting the target offset digital compensated detection signal to the analog offset signal using a digital-to-analog converter (DAC).

15. A system comprising,
an optical proximity sensor to detect the presence, proximity and/or motion of an object within a sense region of the optical proximity sensor;
a subsystem capable of being enabled and disabled; and
a comparator or processor that receives a digital output of the optical proximity sensor and enables and disables the subsystem based on the digital output of the optical proximity sensor;
wherein the optical proximity sensor includes
a driver that selectively drives a light source to transmit light;
a light detector that produces an analog detection signal indicative of an intensity of light detected by the light detector, wherein the light detected by the light detector includes
light transmitted by the light source that reflected off an object within the sense region of the optical proximity sensor,
interference light, which comprises light transmitted by the light source, and detected by the light detector, that did not reflect off an object within the sense region of the optical proximity sensor, and
ambient light;
an offset signal generator that selectively produces an analog offset signal that is combined with the analog detection signal produced by the photodetector to produce an analog compensated detection signal;
an analog-to-digital converter (ADC) that converts the analog compensated detection signal to a digital compensated detection signal; and
wherein the analog offset signal compensates for at least a portion of the interference light included in the light detected by the light detector;
wherein the analog offset signal is combined with the analog detection signal to produce the analog compensated detection signal upstream of the ADC, which increases a dynamic range of the ADC compared to if the analog offset signal is not combined with the analog detection signal to produce the analog compensated detection signal upstream of the ADC; and
wherein the digital compensated detection signal comprises the digital output of the optical proximity sensor.

16. The system of claim 15, wherein the optical proximity sensor also includes:
a timing controller that produces a transmit signal that is used to synchronize the offset signal generator's selective producing of the analog offset signal with the driver's selective driving of the light source, so that the analog offset signal is produced at the same time that the light source transmits light.

17. The system of claim 15, wherein:
the ADC of the optical proximity sensor is an ADC with analog-to-digital-to-analog (ADA) feedback; and
a digital output of the ADC with ADA feedback is indicative of a proximity of an object to the light detector with at least a majority of the ambient light detected by the light detector rejected, and with at least a majority of the interference light compensated for.

18. The system of claim 15, wherein there is no opaque barrier, between the light source and the light detector, configured to optically isolate the light source from the light detector.

* * * * *

UNITED STATES PATENT AND TRADEMARK OFFICE
CERTIFICATE OF CORRECTION

PATENT NO. : 8,848,202 B2  
APPLICATION NO. : 13/360168  
DATED : September 30, 2014  
INVENTOR(S) : Dyer et al.

Page 1 of 1

It is certified that error appears in the above-identified patent and that said Letters Patent is hereby corrected as shown below:

Claims:

Col. 15, line 13 (claim 3): after "object" and before "to the" insert -- relative --

Col. 16, line 12 (claim 8): after "object" and before "to the" insert -- relative --

Col. 17, line 27 (claim 12): after "signal" and before "for" delete "compensated" and substitute therefore -- compensates --

Col. 18, line 28 (claim 15): after "signal;" insert -- and --

Col. 18, line 31 (claim 15): after "signal;" delete "and"

Col. 18, line 36 (claim 8): after "detection signal" and before "to produce" insert -- upstream of the ADC --

Col. 18, line 56 (claim 17): after "object" and before "to the" insert -- relative --

Signed and Sealed this  
Second Day of August, 2016

Michelle K. Lee  
*Director of the United States Patent and Trademark Office*